United States Patent [19]

Filderman

[11] 4,103,761
[45] Aug. 1, 1978

[54] BRAKE FRICTION-LINING SUPPORT

[75] Inventor: René Gabriel Filderman, Asnieres, France

[73] Assignee: Societe Anonyme Francaise du Ferodo, Paris, France

[21] Appl. No.: 785,752

[22] Filed: Apr. 7, 1977

[30] Foreign Application Priority Data

Apr. 8, 1976 [FR] France .................................. 76 10219

[51] Int. Cl.² ............................................. F16D 65/02
[52] U.S. Cl. ................................ 188/73.5; 188/250 B
[58] Field of Search ................... 188/73.1, 73.5, 250 B, 188/250 E, 250 G, 250 R

[56] References Cited

U.S. PATENT DOCUMENTS

| 3,275,105 | 9/1966 | Petit | 188/250 B |
| 3,918,555 | 11/1975 | Rath | 188/250 R |
| 3,966,026 | 6/1976 | Filderman | 188/250 B X |

FOREIGN PATENT DOCUMENTS 929,179  6/1963  United Kingdom ................ 188/250 R Primary Examiner—Duane A. Reger
Attorney, Agent, or Firm—Young & Thompson

[57] ABSTRACT

In a brake friction-lining support which comprises a stack of wholly metallic sheets which are contiguous to each other over their entire facing surfaces and are assembled together by localized assembly structure, at least some of the localized assembly structure is provided on the edges of the support.

16 Claims, 9 Drawing Figures

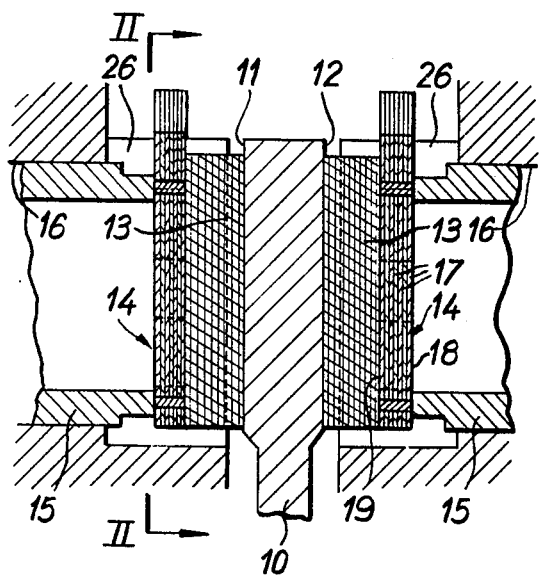
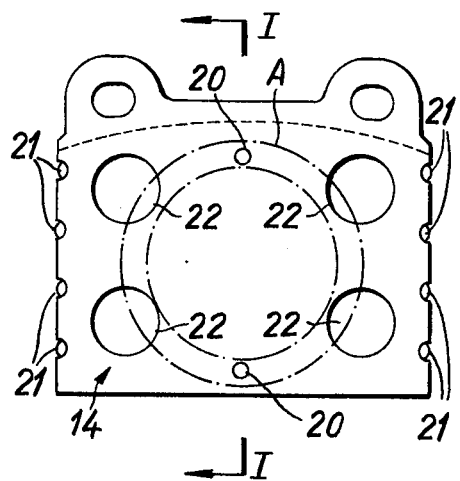
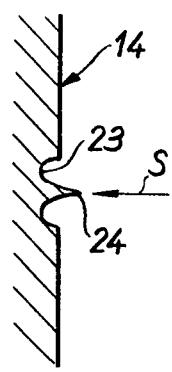
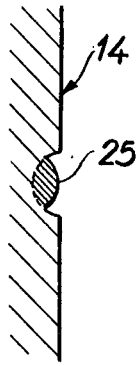
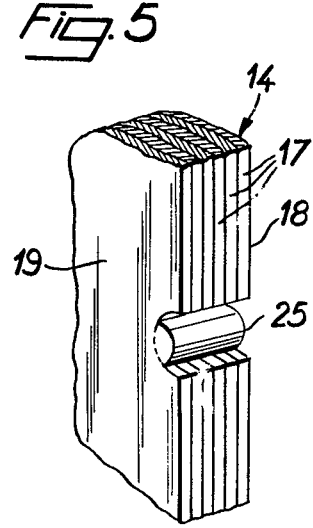

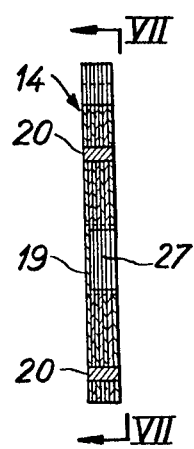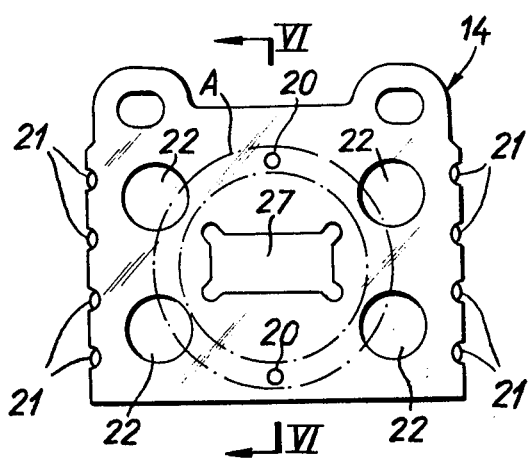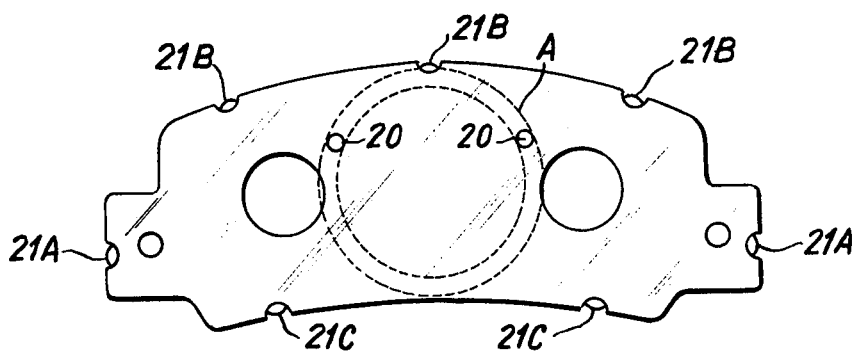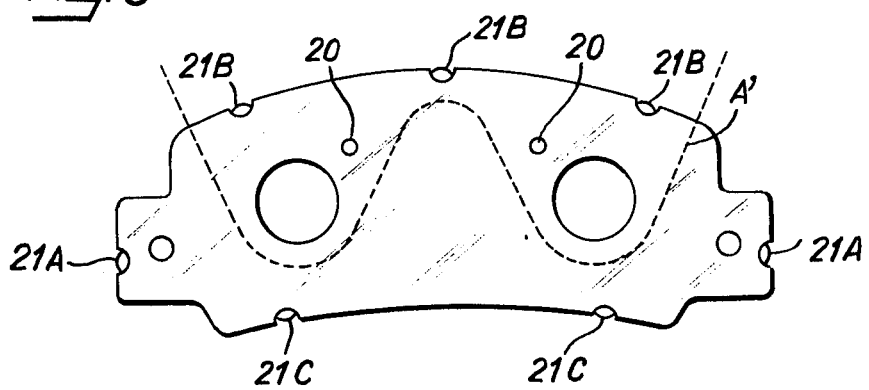

BRAKE FRICTION-LINING SUPPORT

BACKGROUND OF THE INVENTION

1. Field of the Invention

The invention relates to an anti-noise support for a friction-lining of a braking member.

2. Description of the Prior Art

In French Patent Application No. 73 38421 filed 29th October, 1973, in the First Certificate of Addition thereto No. 74 34 890 filed on the 17th October, 1974, and in the Second Certificate of Addition thereto No. 75 27 991 filed on the 12th September, 1975 there is described a support for a friction-lining of a braking member, in which the lining is fixed to the support and is intended to be applied against a braking surface by operating means acting or reacting on the support over a contact area thereof, said support comprising a stack of wholly metallic sheets and which are contiguous to each other over their entire facing surfaces and are assembled to one another by localised assembly means.

It has appeared that such localised assembly means enable braking noise to be reduced and even sometimes to be eliminated, provided that these assembly means are few in number, so as to leave sufficiently wide free zones between them.

In the Second Certificate of Addition No. 75 27 991 at least part of the localised assembly means are disposed on the contact area by which the operating means act or react on the support.

SUMMARY

It has been found that the support can have considerably improved behaviour when the assembly means are moved to the edges of the support.

According to the present invention a support as first set forth above is characterised in that at least part of the localised assembly means are provided on edges of the support.

As the result of this arrangement the stacked sheets constituting the support cannot fan out in the course of operation, in view of the fact that excellent connection is achieved peripherally.

For preference at least some of the localised assembly means thus provided on the edges of the support are disposed on each side of the support which co-operate with the lateral reacting supports. It has in fact been found that application contacts in such regions may result in hammering which tends to move the sheets apart, and the presence of the localised assembly points along the edges tends to reduce the risk of moving the sheets apart.

The localised assembly means are also preferably provided, at least in the case of some of them, in accordance with the object of the Second Certificate of Addition No. 75 27 991, in the contact area by which the operating means act or react on the support.

It is advantageous for at least certain of the localised assembly points to be designed to comply with the double condition of being situated on the edge of the support and of being situated at the same time on the contact area by which the operating means act or react on the support.

For preference each localised assembly point on the edge of the support is made by fusion of material in order to form a weld bead connecting together the various superimposed elements constituting the support.

Another object of the invention is a friction-lining support of a braking member, in which a blind hole is provided for assembly requirements. This object is in particular characterised in that the blind hole is formed by means of holes which are provided opposite one another in the various consecutive sheets of the support, including one end sheet situated on one side of the support, while the other end sheet, and also optionally one or more adjacent sheets, is or are not provided with such a hole, so as to form the bottom of the blind hole in a very simple manner.

This characteristic of construction of a blind hole may be adopted either independently or in combination with the first object comprising localised fastening points on the periphery of the support.

BRIEF DESCRIPTION OF THE DRAWINGS

FIG. 1 is a diagrammatic view in section of a disk brake the two pads of which are provided with supports according to the invention, on the line I—I in FIG. 2, FIG. 2 is an elevation in the direction of the arrows II—II in FIG. 1, FIG. 3 shows to a larger scale one of the plates forming the support at the position of a fusion connection point, the plate being shown before the fusion, FIG. 4 is a similar view to FIG. 3 but after fusion, and shows the corresponding weld bead, FIG. 5 is a view in perspective of the weld bead, FIG. 6 is a view of a modified support, in section on the line VI—VI in FIG. 7, FIG. 7 is a view in elevation of the modified embodiment in the direction of the arrows VII—VII in FIG. 6, and FIGS. 8 and 9 illustrate another modified embodiment.

DESCRIPTION OF THE PREFERRED EMBODIMENTS

Referring to FIGS. 1 to 5, which, by way of example, illustrate a disc brake, particularly for automobile vehicles, which comprises a rotatable disc 10 having two opposite friction tracks 11 and 12. Against each track 11 or 12 can be applied a friction lining 13 of a brake element, such as a pad having a support 14 to which the lining 13 is fixed.

The friction lining 13 is applied against the track through the effect of an action (or reaction) which is applied to the support 14 on a contact area A by a control means shown as a piston 15 which is slidable in a cylinder 16, and is adapted to be subjected to hydraulic pressure.

The support 14 is adapted to be received by its lateral sides, through the effect of braking reaction, so as to bear against the lateral abutting surfaces 26, of FIG. 1, of the brake. The surfaces 26 form part of the fixed frame of the brake in the example illustrated in FIG. 1, but could also be provided on a movable transfer part adjusted to abut the fixed frame.

In the example shown in FIGS. 1 and 2 each piston 15 is tubular and the contact area A is annular. The support 14 comprises a stack consisting of a plurality of sheets 17 (four in the example illustrated), all of which are metallic, uniformly flat, and contiguous over their entire mutually facing surfaces.

The stack of sheets 17 is contained between an inner metal sheet 19 adjacent the lining 13 and an outer metallic sheet 18. The sheets 17 and the metallic sheets 18 and 19 are all identical and are connected by localised assembly means 20 and 21.

The lining 13 is fixed to the support 14 constructed in this manner by being anchored at 22 in the holes provided for the purpose in the support 14.

Certain of the localised connection means 20 and 21 (FIG. 2), which are designated 20, are provided on the annular contact area A by which the piston 15 acts on the support 14, and are uniformly distributed over this area A, particularly with circular symmetry.

In particular, in the example shown in FIG. 2, two connection points 20 are provided in diametrically opposite positions in the direction of the height of the pad. These connection points 20 in the example illustrated are in the form of weld spots.

In addition, certain of the connection means 20 and 21, which are designated 21, comprise weld spots disposed on the edge of the support 14 and extend in the form of beads along transverse lines which extend over the entire width of the edge of the support.

In the example illustrated in FIGS. 3 to 5 the edge of each sheet 17 or 18, 19 is provided with cutouts 23 having a central tip 24.

The various sheets 17, 18, 19 of the support 14 are placed side by side with the cutouts 23 and the tips 24 disposed side by side. A welding action S, FIG. 3, is applied by fusion to the various tips 24, which through the effect of fusion produces a weld bead 25 (FIGS. 4 and 5), thus joining together the various sheets 17, 18 and 19.

In the example shown in FIGS. 1 to 5, four weld spots 21 regularly spaced apart are thus provided on each of the opposite side edges of the support 14. After the weld 21 has been made, the edges of the support 14 are advantageously trued.

It should be noted that because of the connection of the side edges of the supports 14 by the weld spots 21 all risk of deformation through the effect of the application of the reaction abutments 26 against the side areas is avoided (FIG. 1). It will be noted that the connection points 20 provided opposite the application zone A in turn make it possible to avoid the barrelling of the support 14 when the latter is in service.

In other words, because of the selection of the connection points both at 20 in a central zone of the pad opposite the support region A and also at 21 of the edges which are subjected to a reaction abutment action at 26, irreproachable behaviour of the support is obtained, while avoiding all deformation in the course of operation.

Reference will now be made to FIGS. 6 and 7, in which the arrangement is similar to that which has just been described with reference to FIGS. 1 to 5, but in which a hole 27 is provided in the sheets 17 and the sheet 18, while the sheet 19 does not have a hole. This hole is intended to cooperate with a part of rectangular section (not shown) forming part of the brake for assembly requirements.

Reference will now be made to FIGS. 8 and 9, in which the arrangement is similar to that described in connection with FIGS. 1 to 5, and in which the weld spots disposed to correspond to the contact area A of the piston 15 (FIG. 8) can be seen at 20. However, the weld spots 20 are here not disposed on a vertical axis but at the same horizontal level.

The support also has weld spots 21 disposed on the periphery of the support. Certain of these spots, designated 21A, are disposed on the sides which cooperate with the reaction areas 23, while the others, designated 21B and 21C, are placed on the top and bottom profiles of this support respectively.

In the example shown in FIG. 9 the contact area A', instead of being annular as in FIG. 8, has a W-shape, and includes not only the weld spots 20 but also the spots 21B.

It will therefore be appreciated that the connection points are here situated either in positions corresponding to the thrust or reaction regions, like the points 20, or on the periphery of the support, like the points 21A and 21C, or in the case of certain of them, like the points 21B in FIG. 9, in an arrangement such that they comply with both these conditions at the same time.

I claim:

1. An anti-noise support for a friction-lining of a braking member, in which the lining is fixed to the support and is intended to be applied against a braking surface by operating means acting or reacting on the support over contact area thereof, said support comprising a stack of wholly metallic sheets which are contiguous to each other over their entire facing surfaces and are assembled together by localised assembly means, characterised in that at least some of the said localised assembly means are provided on edges of the support and comprise a plurality of spaced welds extending on transverse lines which extend over the entire width of the edges of the support, at least one of said welds being located in each of the lateral edges of the support by which the support is intended to be in reaction abutment contact.

2. A support according to claim 1, characterised in that the welding is of the fusion type.

3. A support according to claim 1, characterised in that a cutout is provided before the welding operation.

4. A support according to claim 1, characterised in that the edge receiving the weld is trued after welding.

5. An anti-noise support according to claim 1, characterised in that on each edge in reaction abutment contact a plurality of regularly spaced welds is provided.

6. A support according to claim 1, characterised in that some of the welds are provided on the contact area by which the operating means act or react on the support.

7. A support for a friction-lining of a braking member, in which the lining is fixed to the support and is intended to be applied against a braking surface by operating means acting or reacting on a contact area thereof, comprising a stack of wholly metallic sheets which are contiguous to each other over their entire facing surfaces and are assembled together by localised assembly means, characterised in that a blind hole is provided in the support by means of holes which are disposed facing one another in various consecutive sheets of the support, including one end sheet situated on one side of the support, while the other end sheet is not provided with such a hole.

8. An anti-noise support for a friction-lining of a braking member, in which the lining is fixed to the support and is intended to be applied against a braking surface by operating means acting or reacting on the support over contact area thereof, said support comprising a stack of wholly metallic sheets which are contiguous to each other over their entire facing surfaces and are assembled together by localised assembly means, characterised in that at least some of the said localised assembly means are bonding means provided on peripheral edges of the support.

9. A support according to claim 8, characterised in that at least some of the localised assembly means are provided on the lateral edges of the support by which the abutment reaction is taken.

10. A support according to claim 8, characterised in that the said localised assembly means comprise welds extending on transverse lines which extend over the entire width of the edges of the support.

11. A support according to claim 8, characterised in that the welding is of the fusion type.

12. A support according to claim 8, characterised in that a cutout is provided before the welding operation.

13. A support according to claim 8, characterised in that the edge receiving the assembly means is trued after welding.

14. A support according to claim 8, characterised in that the localised assembly means are applied to each of the lateral edges of the support by which the support is intended to be in reaction abutment contact.

15. An anti-noise support according to claim 8, characterised in that on each edge a plurality of regularly spaced assembly means is provided.

16. A support according to claim 8, characterized in that at least some of the localised assembly means are provided on the contact area by which the operating means act or react on the support.

* * * * *